United States Patent
Hutchison et al.

(10) Patent No.: US 6,801,760 B2
(45) Date of Patent: Oct. 5, 2004

(54) CONTROL OF RECEIVER IMMUNITY TO INTERFERENCE BY CONTROLLING LINEARITY

(75) Inventors: James A. Hutchison, San Dieog, CA (US); Eli Yona, Binyamina, IL (US); Graham Smith, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 143 days.

(21) Appl. No.: 09/916,375

(22) Filed: Jul. 26, 2001

(65) Prior Publication Data

US 2002/0072340 A1 Jun. 13, 2002

Related U.S. Application Data

(60) Provisional application No. 60/223,674, filed on Aug. 8, 2000.

(51) Int. Cl.[7] .................................................. H04B 1/04
(52) U.S. Cl. ................................ 455/127.3; 455/343.2; 455/67.13; 455/69
(58) Field of Search ............................... 455/522, 67.13, 455/69, 568.7, 570, 572, 573, 574, 127.3, 343.2, 343.5, 63.1, 341, 194.2, 226.3, 234.1, 234.2, 226.1, 67.11

(56) References Cited

U.S. PATENT DOCUMENTS

| | | | |
|---|---|---|---|
| 5,179,724 A | * | 1/1993 | Lindoff ........................ 455/574 |
| 5,722,061 A | | 2/1998 | Hutchison, IV et al. |
| 6,282,177 B1 | * | 8/2001 | Ostermiller et al. ......... 370/278 |
| 6,288,609 B1 | * | 9/2001 | Brueske et al. ........... 455/234.1 |
| 6,298,221 B1 | * | 10/2001 | Nguyen ....................... 455/296 |
| 6,311,048 B1 | * | 10/2001 | Loke ........................ 455/343.2 |

FOREIGN PATENT DOCUMENTS

| | | |
|---|---|---|
| EP | 0366485 | 5/1990 |
| WO | 0018023 | 3/2000 |

\* cited by examiner

*Primary Examiner*—Nick Corsaro
*Assistant Examiner*—John J Lee
(74) *Attorney, Agent, or Firm*—Philip Wadsworth; Charles D. Brown; Howard H. Seo

(57) ABSTRACT

A radio receiver has a low noise amplifier. The low noise amplifier is enabled. If a predicted level of interference is expected to produce an acceptable bit error rate or other signal error measurement, the low noise amplifier is set to a "low" linearity level. If the predicted level of interference is not expected to be acceptable, the low noise amplifier is adjusted to a "high" level of linearity. The level of linearity required is determined by checking one or more prediction criteria: the mobile station's current operating mode, the strength of a received signal, the strength of a signal transmitted by the mobile station, the current level of interference, an acceptable level of interference, and whether the low noise amplifier is enabled or bypassed. Each of the prediction criteria may not be weighted equally. The determination is repeated as the prediction criteria change.

21 Claims, 5 Drawing Sheets

CONTROL OF RECEIVER IMMUNITY TO INTERFERENCE BY CONTROLLING LINEARITY

RELATED APPLICATIONS

This application claims priority to U.S. Provisional Application No. 60/223,674, filed Aug. 8, 2000.

BACKGROUND OF THE INVENTION

1. Field of the Invention

The present invention relates generally to radio communications. Particularly, the present invention relates to improving a communication receiver's immunity to interference.

2. Description of the Related Art

There are multiple types of cellular telephone systems in operation. These systems include the advanced mobile phone system (AMPS) and two digital cellular systems: time division multiple access (TDMA) and code division multiple access (CDMA).

Cellular systems operate by typically locating multiple antennas in the center of a cell covering a geographic region. The AMPS cells are separate and distinct from the CDMA cells so that the cells of each system overlap. This makes it likely that the antenna for one system's cell may be located in a cell of another system. Likewise, within a particular system (e.g., AMPS, CDMA, TDMA), there are at least two service providers within a given area. These providers often choose to place cells in different geographical locations from the competitor. Hence, there are situations where a telephone on system 'A' might be far away from the nearest system 'A' cell while close to a system 'B' cell. This situation means that the desired receive signal might be weak in the presence of strong multi-tone interference.

The intermixing of system antennas can cause problems for a mobile station that is registered in one system, such as the CDMA system, and travels near another system's antenna, such as an AMPS antenna. In this case, the signals from the AMPS antenna can interfere with the CDMA signals being received by the mobile station due to the proximity of the mobile station with the AMPS cell or the higher power of the AMPS forward link signal. This is referred to in the art as 'jamming'.

It is frequently the case in an AMPS system for carriers to 'jam' a competitor's system unintentionally. One of the goals of a cellular carrier is to provide a high signal-to-noise ratio for all the users of their system by placing cells close to the ground or near their users and radiating the FCC power limit for each channel. This technique provides for better signal quality for one carrier's system at the expense of interfering with the competitor's system.

One way to improve the immunity of a receiver to interference or jamming is to increase the current to the receiver. This is not a practical solution, however, for a mobile station that relies on battery power. Increasing the current would drain the battery more rapidly, thereby decreasing the talk and standby time of the mobile station. Additionally, a detector is typically used to detect the presence of the jamming signal. However, by the time the jamming signal has been detected and the linearity of the receiver increased, the jamming signal may no longer exist.

There is a resulting need to quickly control a mobile station's immunity to interference without greatly increasing power consumption.

SUMMARY OF THE INVENTION

The present invention provides control of the linearity of a low noise amplifier in a receiver of a mobile station. This provides the desired level of immunity to interference while reducing the average current consumption of the receiver. In a battery powered device, reducing the current consumption has the effect of increasing talk and stand-by times.

The present invention encompasses a process for controlling the linearity of a low noise amplifier. The low noise amplifier is first enabled. It is then determined if a predicted level of interference will produce an acceptable bit error rate or other signal error measurement.

If the predicted level of interference is not going to be acceptable, the low noise amplifier is adjusted to a high level of linearity. If the predicted level of interference is acceptable, the low noise amplifier is set to a low level of linearity.

DETAILED DESCRIPTION OF THE PREFERRED EMBODIMENT

The present invention provides different levels of immunity, in response to a control signal, to predicted levels of interference. Current consumption is improved by reducing the low noise amplifier's (LNA) linearity when reduced immunity provides a desired level of performance (e.g., bit error rate). Increasing the LNA's linearity when greater immunity is required increases the receiver's immunity to interference. This linearity control is based on a predicted or expected level of interference.

Figure 1:
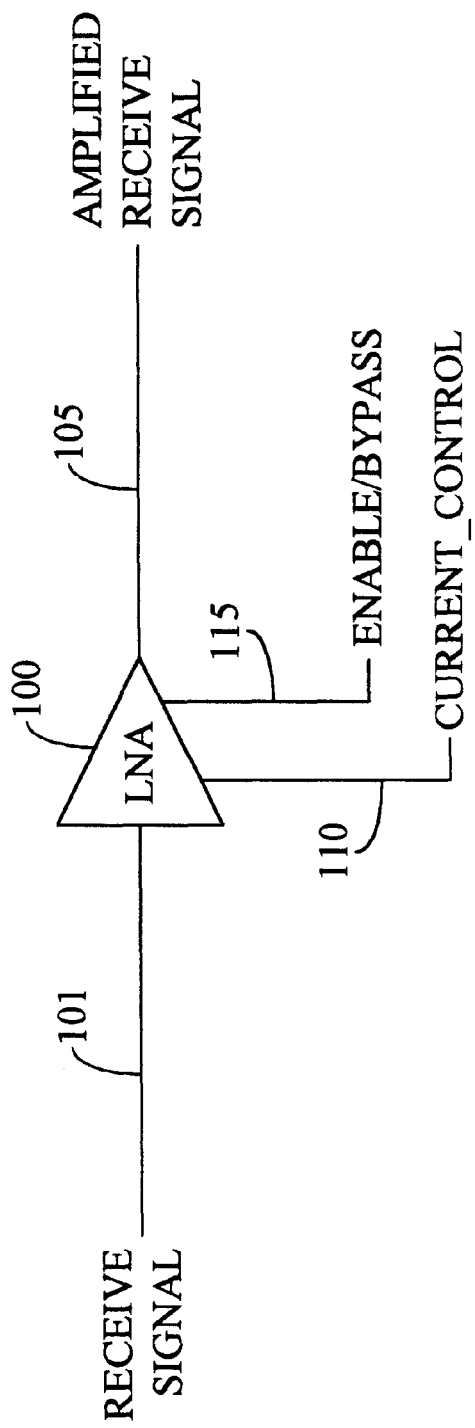
FIG. 1 shows a block diagram of a low noise amplifier of the present invention.

FIG. 1 illustrates a block diagram of the preferred embodiment of the LNA (100) of the present invention. The LNA is comprised of an input received signal (101). In the preferred embodiment, this received signal (101) is at a radio frequency for the system in which the LNA (100) is operating.

The amplified received signal (105) is output from the LNA. The level of amplification of the received signal (101) is dependent upon the current control signal (110) and the enable/bypass signal (115) of the present invention.

Figure 2:
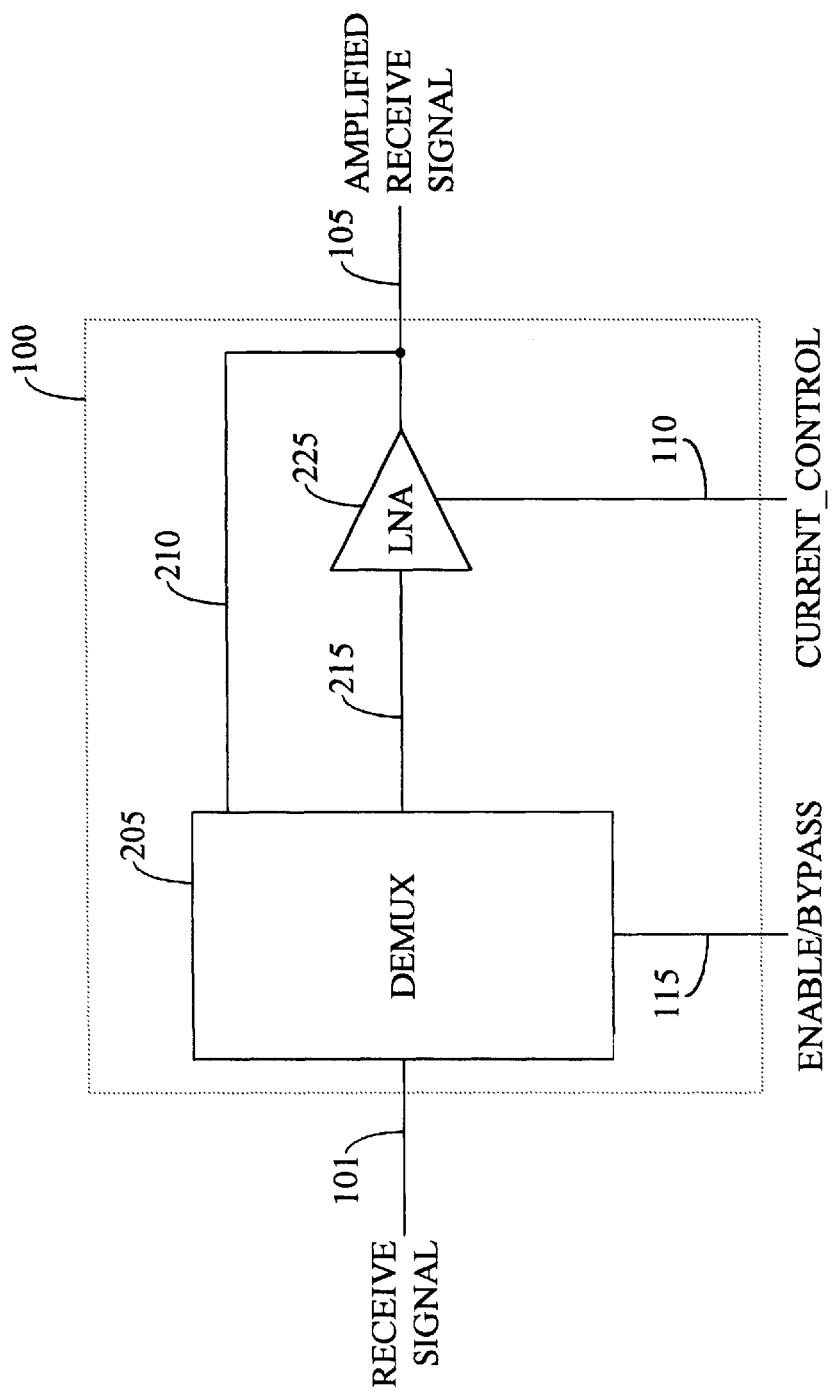
FIG. 2 shows an embodiment of the enable/bypass function in accordance with the low noise amplifier of the present invention.

FIG. 2 illustrates an example of an enables/bypass function of the present invention. The enable/bypass function incorporated into the LNA (100) is comprised of a demultiplexer (205). The received signal (101) is the input signal to the demultiplexer (205). The enable/bypass signal (115) selects between one of the two outputs (210 and 215) of the demultiplexer (205). The first output (210) bypasses the LNA function (225) of the present invention. The second output (215) is an input to the LNA function (225) of the present invention.

As in the embodiment illustrated in FIG. 1, the current control signal (110) is input to the LNA function (225). The amplified received signal (105) is output from the LNA function (225).

The enable/bypass function shown in FIG. 2 is for illustration purposes only and is just one example of such an enable/bypass function. Many different switching scenarios may perform this function. The present invention is not limited to any one of these various scenarios.

Figure 3:
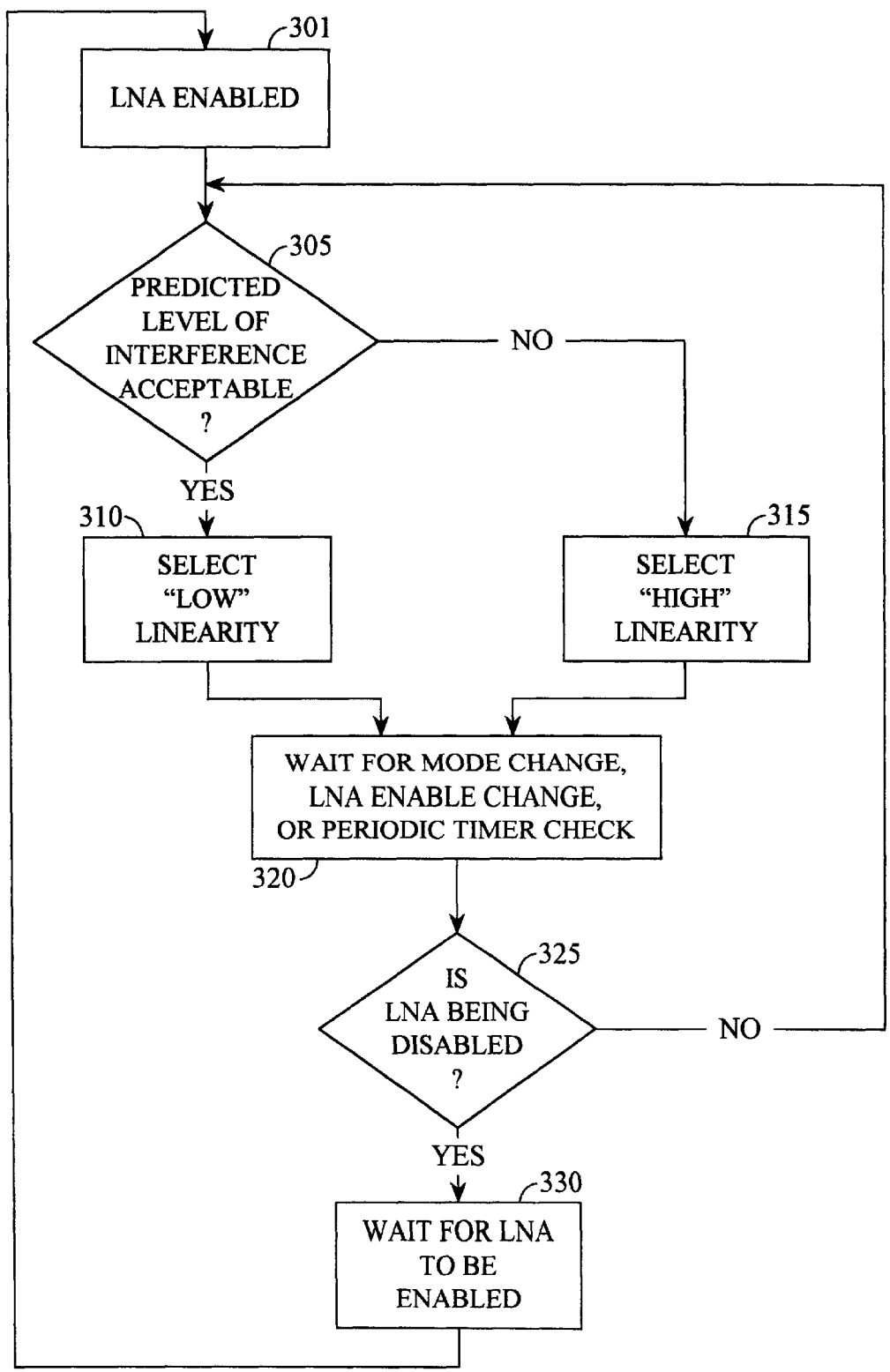
FIG. 3 shows a flowchart of the present invention for changing the linearity of a low noise amplifier.

FIG. 3 illustrates a flowchart of a process of the present invention for controlling the LNA's linearity by the current control signal. In this embodiment, the LNA is set to either a low or high linearity setting by a step function current control signal.

The process begins with the LNA being enabled (step 301). This enablement may be performed as illustrated in FIG. 2 or using any other enabling means.

The level of interference is predicted to determine if it will be acceptable for a desired performance level of the mobile station (step 305). The level of interference may be predicted based on many factors: the location of the mobile station and the frequency on which the mobile station is operating (i.e., which service provider it is using), the power control commands sent to the mobile station, the current operating mode of the mobile station, the strength of a received signal, the strength of a transmitted signal, the current level of interference, acceptable level of interference, and whether the LNA is enabled or bypassed.

Whether the predicted level of interference is acceptable may be based on one or a combination of the above factors. Some of these factors may not be weighted equally. For example, the acceptable level of interference may be considered more important in predicting the interference level than the other factors so this will be weighted more than the other factors.

When a first cellular system is installed in a certain geographical location, it may be known that a second cellular system is operating on a frequency that interferes with some, or all, of the channels of the first cellular system. Additionally, other interfering transmissions in the area, such as the emergency radio band, may be known to cause interference to some, or all, of the channels of the first cellular system.

Another factor in predicting the level of interference is the power control commands received by the mobile station. When the mobile station receives a number of "increase power" commands from the base station this may be an indication that an area of high interference is being entered.

Yet another factor in predicting the level of interference is the operating mode of the mobile station (e.g., AMPS, CDMA). The operating mode includes on which frequency the mobile station is operating. As discussed above, it may be known that a certain frequency band experiences a certain level of interference. Therefore, if the mobile station is in the CDMA mode and it is known that an AMPS signal interferes with CDMA signals in the area, this will be used by the process of the present invention to predict the level of interference.

The strength of a received or transmitted signal is another indication in predicting the level of interference. The received signal strength indicates the level of interference by comparing periodic samples of the received power to a predetermined threshold or, in the case of non-binary linearity, thresholds. The transmit signal strength indicates the level of interference by comparing periodic samples of the transmit power to the predetermined threshold or thresholds.

Interference can be internally or externally generated. The mobile station's transmitter can generate internal interference. For predictable momentary interference from such a source, such as during half-duplex transmission, the interference can be acceptable. In this case, the internally generated interference can be predicted based on a combination of the current operating mode and/or the strength of the transmitted signal. Externally generated interference can be detected by various methods such as the method illustrated and discussed subsequently in relation to the embodiment of FIG. 5.

Yet another indication in predicting the level of interference is whether the LNA is enabled or bypassed/disabled. When the LNA is disabled, increasing the LNA linearity is not necessary.

Referring again to the process of FIG. 3, if it is determined that the level of interference will be below a predetermined threshold of interference, a "low" linearity mode of the LNA is selected (step 310). In one embodiment, this may be accomplished by setting the current control signal to a predetermined fixed "low" level.

The current control signal required to operate the LNA in the "low" linearity mode may be determined by experimentation. Similarly, the level of linearity required by the LNA for adequate performance of the receiver operating in the predicted level of interference may also be determined by experimentation.

The predetermined threshold of interference that is acceptable for proper operation of the mobile station was determined during the design of the mobile station. This threshold cannot be specified as being in any one range since it varies with the design of the mobile station. In the preferred embodiment, the acceptable level of operation is determined by the symbol error rate (SER) of the amplified received signal. Alternate embodiments use other forms of error determination.

If it is determined that the predicted level of interference will be above the predetermined threshold of interference, a "high" linearity mode of the LNA is selected (315). As in the low linearity mode, the current control signal required to operate the LNA in the "high" linearity mode may be determined by experimentation.

Since the mobile station is operating in a dynamically changing environment, once the linearity mode of the LNA is set (step 310 or 315) various predetermined criteria are then checked to determine if anything has changed (step 320) that would require changing the LNA's linearity. These criteria include whether the mobile station's mode has changed, whether the LNA has been enabled or disabled, or whether a periodic timer has expired. The process waits for one of these criteria to change before proceeding (step 320).

If the mobile station's mode has changed, a new environment has been entered and, therefore, the level of interference that is encountered will be different. As discussed above, this may require a different level of LNA linearity.

If the LNA has been disabled, an attempt to change the linearity of the LNA will have no effect. Additionally, after a certain amount of time it can be assumed that the mobile station has entered another level of interference and the linearity of the LNA should be changed. This can be checked by determining the time from the last adjustment to the LNA's linearity. Comparing his time to a threshold time gives an indication of when the interference level should be rechecked. This threshold time will vary for different situations. Some situations may require periodic timer checks every few microseconds. Other situations may require periodic checks every hundred milliseconds.

Referring again to FIG. 3, if it has been determined that the LNA has not been disabled (step 325) the process returns to predicting whether or not the level of interference is acceptable (step 305). If it has been determined that the LNA is being disabled (step 325), the process then waits for the LNA to be enabled (step 330). When this occurs, the process returns to the first step in the process when the LNA was enabled (step 301).

Figure 4:
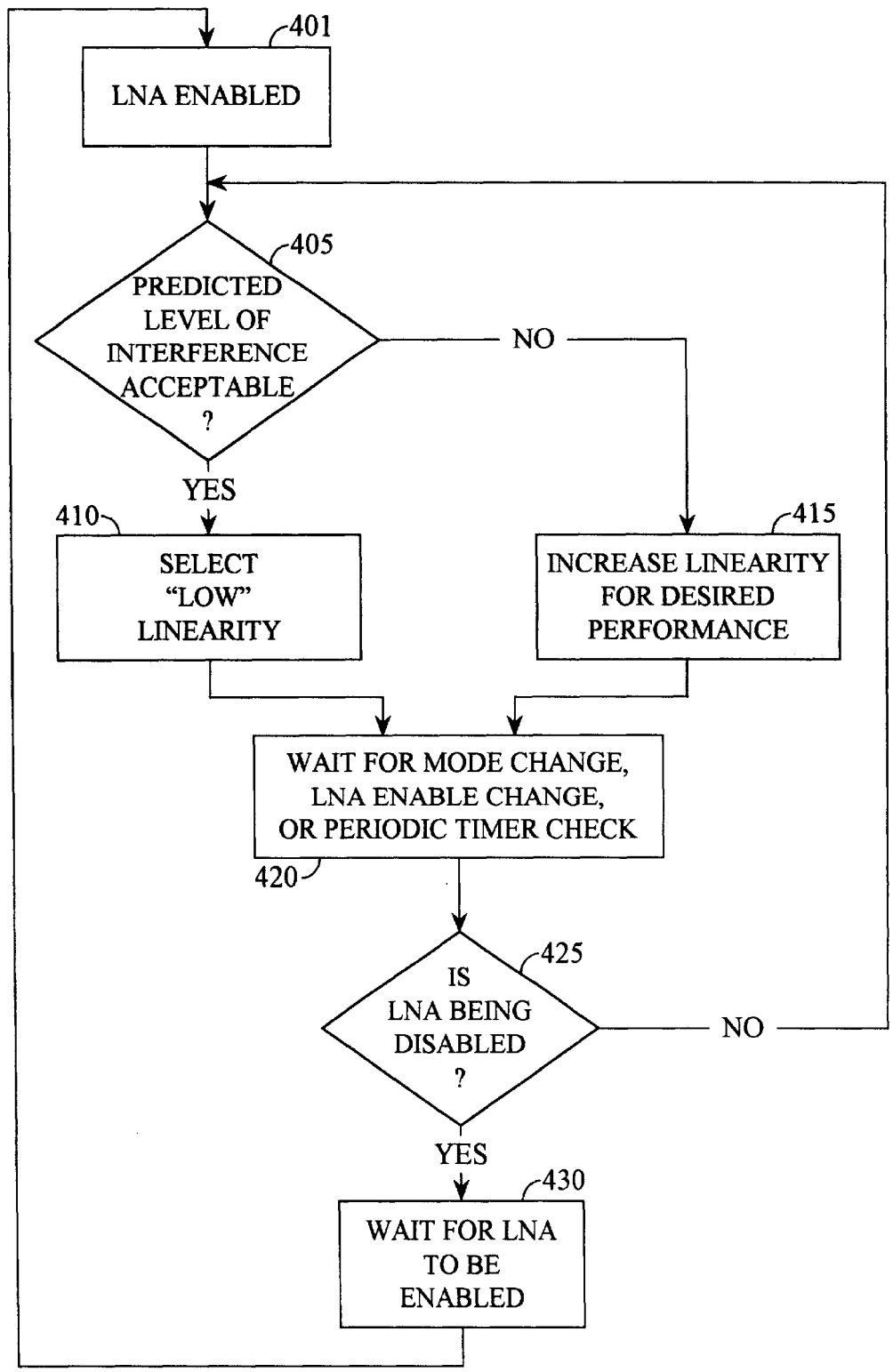
FIG. 4 shows a flowchart of an alternate embodiment process of the present invention.

FIG. 4 illustrates a flowchart of an alternate embodiment process of the present invention. While the embodiment of FIG. 3 uses a step function as the current control signal, the embodiment of FIG. 4 uses a continuously variable signal as the current control signal.

The embodiment of FIG. 4 is similar to the process illustrated in FIG. 3 in that the LNA is enabled (step 401) and the predicted level of interference is checked for acceptability (step 405). If the predicted interference level is acceptable, the linearity is set for low linearity mode (step 410).

If the predicted interference level is not acceptable, the linearity mode is continuously varied until the desired performance level is achieved (step 415). In the preferred embodiment, the desired performance level is determined by monitoring the error rate of the amplified received signal output by the LNA. When the error determination reaches a predetermined threshold, the current control signal is held at this point until the next decision is required. Alternate embodiments use other methods for determining the desired performance level and for adjusting the current control signal to achieve the desired performance level.

Once the linearity mode of the LNA has been set, the process waits for either a mode change, the LNA enablement to change, with a periodic timer check to expire (step 420). If the LNA has been disabled (step 425), the process waits for the LNA to be enabled (step 430). If the LNA has not been disabled (step 425), the process returns to predicting if the interference level is acceptable (step 405).

Figure 5:
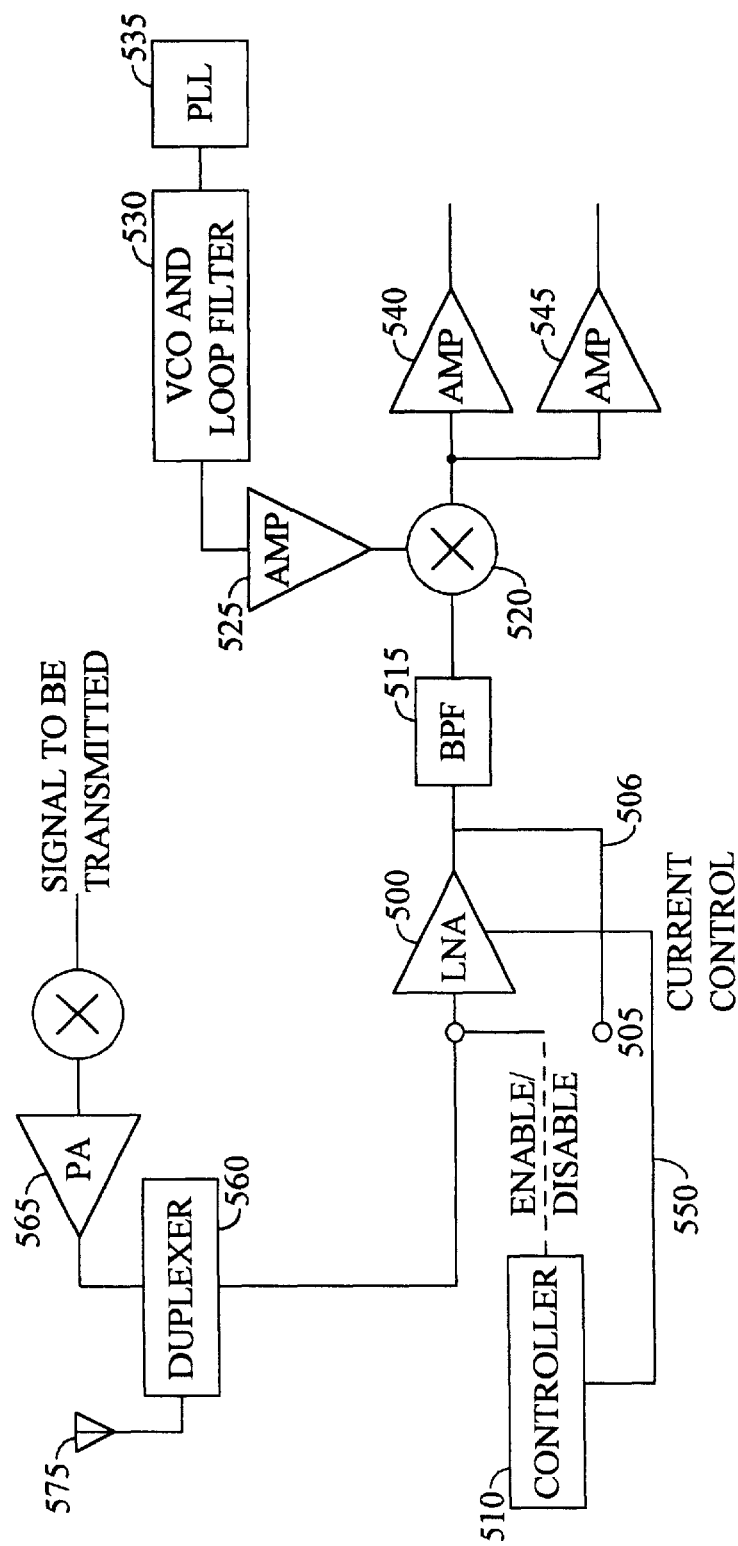
FIG. 5 shows a block diagram of a receiver incorporating the low noise amplifier of the present invention.

The block diagram of FIG. 5 illustrates one embodiment of a mobile station incorporating the apparatus of the present invention for controlling receiver immunity to interference. This embodiment uses a switching function (505) to enable/bypass the LNA function (500) instead of the demultiplexer illustrated in FIG. 2. The apparatus of FIG. 5 is for illustration purposes only. The present invention can be incorporated in other receivers.

This embodiment is comprised of an antenna (575) that receives and transmits radio signals. The transmit path (565) in the radio is coupled to the antenna (575) through a duplexer (560) that separates the received signals from the transmitted signals.

Received signals from the duplexer (560) are input to the LNA (500). The amplified signal from the LNA (500) is output to a bandpass filter (515).

The LNA (500) may be bypassed by a switch (505) coupled to a bypass path (506). The bypass path (506), in conjunction with the switch (505), provides a path around the LNA (500) such that the LNA (500) is disabled when the switch (505) is closed.

The switch (505) is controlled by the mobile station's controller (510). The controller (510) enables or disables the LNA (500) according to the processes of the present invention. The controller (510) may be a microprocessor, a microcontroller, or some other type of controlling circuit that runs the processes illustrated in FIGS. 3 and 4.

After the bandpass filter (515) has filter the received signal, the filtered signal is down-converted to a lower intermediate frequency (IF) for use by the rest of the mobile station. The down-conversion is done by mixing (520) to received signal with another signal having a frequency set by phase locked loop (535) driving a voltage-controlled oscillator (530). This signal is amplified (525) before being input to the mixer (520).

The down converted signal from the mixer (520) is input to a back end AGC (540 and 545). This AGC is used by the mobile station for closed loop power control, as is well known in the art.

In the apparatus of FIG. 5, the current control signal (550) to the LNA (500) is produced by the mobile station controller (510). In one embodiment, the controller (510) produces a step function as required by the process illustrated in FIG. 3. In another embodiment, the controller (510) produces a continuous control signal (550) as required by the process illustrated in FIG. 4. The controller (510) may also be monitoring the output signal from the AGC (540 and 545) as a way of detecting the current level of interference as discussed previously. This current level of interference is used in conjunction with the other factors discussed above in controlling the enabled/bypass switch (505) and generating the continuously variable current control signal (550). In this manner, the controller (510) controls the linearity of the LNA (500) in different environments comprising various levels of interference.

While the preferred embodiment mobile station is a cellular telephone, the processes and apparatus of the present invention can be incorporated into other types of mobile stations. For example, the mobile station may be a modem built into a lap top computer, a personal digital assistant having the capability of receiving radio frequency signals, or any other type of communications device that would benefit from a receiver that changes it's linearity in response to a predicted level of interference.

In summary, the present invention enables a mobile station to travel near antennas of different systems while increasing the mobile station's resistance to radio frequency interference from the other systems. This is accomplished without impacting the talk or standby time of the mobile station. Prior art systems used either a higher linearity LNA, at the expense of power, or would have failed when they encountered significant interference.

What is claimed is:

1. A method for controlling linearity of a low noise amplifier, the method comprising the steps of:

enabling the low noise amplifier;

determining if a predicted level of interference is acceptable;

if the predicted level of interference is not acceptable, selecting a high level of linearity for the low noise amplifier;

if the predicted level of interference is acceptable, selecting a low level of linearity for the low noise amplifier:

waiting for a change in predetermined criteria;

when one of the predetermined criteria has changed, determining if the low noise amplifier is still enabled;

if the low noise amplifier is still enabled, determining if the predicted level of interference is acceptable; and if the low noise amplifier is not enabled, waiting for the low noise amplifier to be re-enabled.

2. The method of claim 1, wherein the predetermined criteria includes a change in a frequency spectrum input to the low noise amplifier, a change in the enablement of the low noise amplifier, and an expiration of a predetermined time.

3. The method of claim 2 wherein the predetermined time comprises a time in which the low noise amplifier is predicted to move out of an area comprising unacceptable interference levels.

4. The method of claim 1 wherein the step of selecting a high level of linearity for the low noise amplifier comprises selecting a high level in a control signal step function that is coupled to the low noise amplifier.

5. The method of claim 1 wherein the step of selecting a low level of linearity for the low noise amplifier comprises selecting a low level in a control signal step function that is coupled to the low noise amplifier.

6. The method of claim 1 wherein the step of enabling the low noise amplifier comprises switching out a bypass path around the low noise amplifier.

7. A method for controlling linearity of a low noise amplifier operating in a mobile station having a plurality of modes, the method comprising the steps of:
 enabling the low noise amplifier;
 determining if a predicted level of interference is acceptable;
 if the predicted level of interference is not acceptable, selecting a high level of linearity for the low noise amplifier;
 if the predicted level of interference is acceptable, selecting a low level of linearity for the low noise amplifier;
 waiting for a change in predetermined criteria;
 when one of the predetermined criteria has changed, determining if the low noise amplifier is still enabled; and
 if the low noise amplifier is not enabled, waiting for the low noise amplifier to be re-enabled.

8. The method of claim 7 wherein the predetermined criteria includes a change in a mode of the plurality of modes of the mobile station, a change in the enablement of the low noise amplifier, and an expiration of a predetermined time.

9. The method of claim 7 wherein the plurality of modes comprise the mobile station operating in different frequency spectrums.

10. The method of claim 9 wherein the predetermined time comprises a time in which the mobile station is predicted to move out of an area having a first interference level into an area having a second interference level that is different from the first.

11. A method for controlling linearity of a low noise amplifier in a receiver of a mobile station, the low noise amplifier having a current control signal input signal that adjusts the linearity of the low noise amplifier, the mobile station comprising a plurality of operational modes, the method comprising the steps of:
 enabling the low noise amplifier;
 determining if a predicted level of interference is acceptable;
 if the predicted level of interference is not acceptable, continuously adjusting the current control signal until the linearity of the low noise amplifier is such that the receiver is operating at an acceptable performance level; and
 if the predicted level of interference is acceptable, selecting a low level of linearity for the low noise amplifier;
 waiting for a change in predetermined criteria;
 when one of the predetermined criteria has changed, determining if the low noise amplifier is still enabled;
 if the low noise amplifier is still enabled, determining if the predicted level of interference is acceptable; and
 if the low noise amplifier is not enabled, waiting for the low noise amplifier to be re-enabled.

12. The method of claim 11 wherein the step of enabling the low noise amplifier comprises switching out a bypass path around the low noise amplifier.

13. The method of claim 11 wherein the predetermined criteria includes a change from a first mode to a second mode of the plurality of modes, a change in the enablement of the low noise amplifier, and an expiration of a predetermined time.

14. The method of claim 13 wherein step of waiting for a change in the predetermined criteria comprises a check of a periodic timer that tracks the length of time since a previous linearity adjustment.

15. The method of claim 11 wherein the step of determining if a predicted level of interference is acceptable comprises checking a current operation mode of the plurality of operational modes.

16. The method of claim 11 wherein the step of determining if a predicted level of interference is acceptable comprises determining a strength of a received signal.

17. The method of claim 11 wherein the step of determining if a predicted level of interference is acceptable comprises determining a strength of a transmitted signal that is transmitted by the mobile station.

18. The method of claim 11 wherein the step of determining if a predicted level of interference is acceptable comprises monitoring an output of the low noise amplifier to determine a current level of interference.

19. The method of claim 11 wherein the step of determining if a predicted level of interference is acceptable comprises determining if the low noise amplifier is either enabled or bypassed.

20. The method of claim 18 wherein the step of determining if a predicted level of interference is acceptable comprises determining a level of interference that generates an acceptable error in the output of the low noise amplifier.

21. A mobile station comprising:
 an antenna that receives a received signal;
 a low noise amplifier comprising an enable/bypass function and a current control function, the current control function being able to change a linearity attribute of the low noise amplifier, the low noise amplifier having means for generating an amplified received signal at an output; and
 a controller that controls the operation of the mobile station, the controller coupled to the low noise amplifier,
 wherein the controller comprises:
 means to control the enable/bypass function and the current control function in response to a predicted level of interference experienced by the mobile station;
 means for continuously adjusting the current control function until the linearity of the low noise amplifier is such that the mobile station is operating at an acceptable performance level if the predicted level of interference is not acceptable;
 means for selecting a low level of linearity for the low noise amplifier if the predicted level of interference is acceptable;
 means for waiting for a change in predetermined criteria;
 means for determining if the low noise amplifier is still enabled when one of the predetermined criteria has changed;
 means for determining if the predicted level interference is acceptable if the low noise amplifier is still enabled; and
 means for waiting for the low noise amplifier to be re-enabled if the low noise amplifier is not enabled.

* * * * *